No. 664,027. Patented Dec. 18, 1900.
J. O'MEARA.
BOLT.
(Application filed May 16, 1900.)
(No Model.)
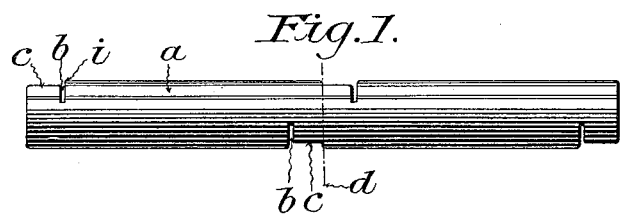
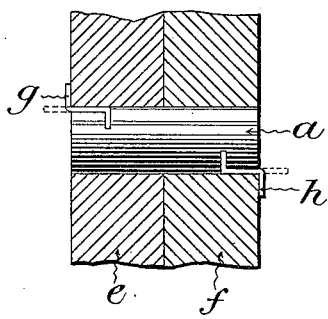
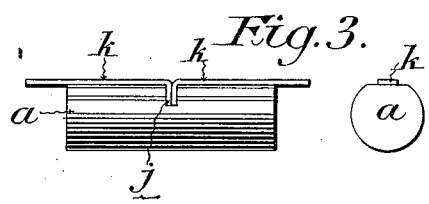
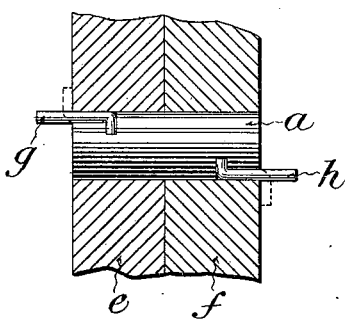
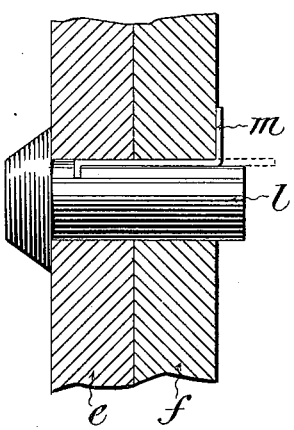
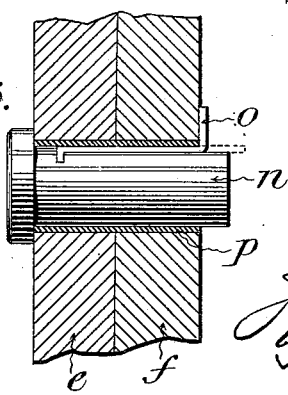
Witnesses:
Inventor.
Jeremiah O'Meara

UNITED STATES PATENT OFFICE.

JEREMIAH O'MEARA, OF NEW YORK, N. Y.

BOLT.

SPECIFICATION forming part of Letters Patent No. 664,027, dated December 18, 1900.

Application filed May 16, 1900. Serial No. 16,887. (No model.)

*To all whom it may concern:*

Be it known that I, JEREMIAH O'MEARA, a citizen of the United States, residing at New York, in the county of New York and State of New York, have invented a certain new and useful Improvement in Bolts, of which the following is a full, clear, and exact description.

This invention has for its object to provide a bolt which may be held in place and may hold together two or more objects without screw-threads or nuts.

In my invention I make use of a flexible key or fastening device for effecting a union of the bolt with the object or objects to which it is applied, and I anchor such fastening device by concealing one of its ends within the bolt itself and engaging its other exposed end with the object to which the bolt is applied, and I use one or more of such keys or fastening devices with each bolt.

In the accompanying drawings, illustrating my invention, in the several figures of which like parts are similarly designated, Figure 1 is an elevation illustrating one embodiment of my invention. Fig. 2 is a sectional elevation showing one application of my invention. Fig. 3 is a side elevation and end view showing another application of my invention. Fig. 4 is a view similar to Fig. 2, but illustrating the use of wire instead of flat metal as the fastening medium. Fig. 5 is a sectional elevation of a headed bolt or rivet applied in accordance with my invention. Fig. 6 is a sectional elevation showing a sleeved and headed bolt.

Without attempting to illustrate or describe all of the various ways in which my invention may be practiced, I will proceed now to describe a sufficient number of illustrations to show the principle and mode of application of my invention.

In Fig. 1, $a$ may represent a bar or rod of any suitable cross-section and any length. At intervals of suitable length said bar is provided with transverse kerfs or grooves $b$, adjacent to which are the slabbed-off portions $c$. These grooves and slabbed-off portions are arranged at intervals alternately on opposite sides of the rod or bar. The bar is divided on the line $d$ in order to form a bolt, and in order to apply and use a bolt of this description it is passed through two or more pieces of material $e\ f$, as shown in Fig. 2, first having had applied to its opposite ends and in the grooves thereof the fastening devices $g\ h$. Each of these fastening devices is applied to the grooves by bending one end at substantially right angles and inserting such bent portion in the groove, so that the other portion shall rest upon or in the slabbed-off portion $c$ and project beyond the bolt. The unreduced edge $i$ of the bar $a$ or bolt forms a shoulder against which the bent end of the fastening abuts, and this shoulder serves to prevent the escape of the fastening in one direction. The free ends of the fastenings (it being understood that a fastening is applied to each end of the bolt) are bent from the dotted-line position to the full-line position, Fig. 2, in order to secure the bolt in the situation in which it is used.

As shown in Fig. 3, the bolt $a$ may have a single groove or kerf $j$, in which the bent ends of fastening devices $k\ k$, leading to and projecting beyond opposite ends of the bolt, may be applied.

As shown in Fig. 4, the fastening devices $g\ h$ may be made of round stock or wire instead of flat stock, as in Figs. 2 and 3, and secured in kerfs or perforations in the bolt.

As shown in Fig. 5, instead of a headless bolt my invention may be applied in connection with a bolt having a head, the letter $l$ designating the bolt, and $m$ the fastening anchored in a kerf or groove in the bolt.

As shown in Fig. 6, the headed bolt $n$ may be supplied with the transverse groove or kerf and the fastening $o$, and the shank of the bolt and fastening may be inclosed in a bushing or sleeve $p$, which serves to inclose the fastening device and prevent its escape from the bolt. This sleeve might form one member of a hinge, while the bolt may be the pintle on the other member, and, furthermore, the sleeve may be applied to any of the other forms of bolts herein referred to.

These and other variations are within the principle and scope of my invention, and I wish so to be understood in the claims herein made, and I especially advert to the fact that my invention is applicable to screw-threaded bolts and may be used as a sort of bolt or nut lock in this connection, and the bolt may be employed with a nut or not.

What I claim is—

1. A threadless bolt, having transverse kerfs or grooves and adjacent slabbed-off portions on opposite sides of opposite ends, and whose fastening device comprises metal pieces applied in said kerfs or grooves and adapted to project beyond the object to which the bolt is applied and be bent down thereupon, substantially as described.

2. A bolt, having a fastening device secured thereto at some unexposed portion and projecting beyond the exposed end of the bolt, combined with a surrounding sleeve, substantially as described.

In testimony whereof I have hereunto set my hand this 14th day of May, A. D. 1900.

JEREMIAH O'MEARA.

Witnesses:
W. A. REDMOND,
J. H. CURRY.